(12) United States Patent
Kimura

(10) Patent No.: US 7,733,512 B2
(45) Date of Patent: Jun. 8, 2010

(54) DATA PROCESSING DEVICE, INFORMATION PROCESSING DEVICE, AND DATA PROCESSING SYSTEM

(75) Inventor: Yoshio Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1096 days.

(21) Appl. No.: 11/276,000

(22) Filed: Feb. 9, 2006

(65) Prior Publication Data

US 2007/0171458 A1     Jul. 26, 2007

(30) Foreign Application Priority Data

Feb. 18, 2005    (JP)    .............................. 2005-042987

(51) Int. Cl.
*G06F 3/12*    (2006.01)

(52) U.S. Cl. .................... 358/1.15; 380/51; 380/282; 713/176

(58) Field of Classification Search ............... 358/1.1, 358/1.15; 713/150–194; 380/282, 51
See application file for complete search history.

(56) References Cited

U.S. PATENT DOCUMENTS 5,633,932 A * 5/1997 Davis et al. ................. 713/176
6,163,383 A * 12/2000 Ota et al. ..................... 358/1.1
6,314,521 B1 * 11/2001 Debry .......................... 726/10
6,438,574 B1    8/2002 Nagashima
6,567,530 B1 * 5/2003 Keronen et al. ............. 382/100
7,305,556 B2 * 12/2007 Slick et al. .................. 713/169
2005/0111023 A1 * 5/2005 Simpson et al. ............ 358/1.13
2005/0152543 A1 * 7/2005 Shima et al. ................. 380/51
2005/0154876 A1 * 7/2005 Buckley et al. ............. 713/156
2006/0203255 A1 * 9/2006 Takaragi et al. .............. 358/1.1
2006/0279773 A1    12/2006 Sakurai et al.

FOREIGN PATENT DOCUMENTS

JP    11-212744    8/1998
JP    11-150559    6/1999

* cited by examiner

*Primary Examiner*—Benny Q Tieu
*Assistant Examiner*—Qian Yang
(74) *Attorney, Agent, or Firm*—Fitzpatrick, Cella, Harper & Scinto

(57) ABSTRACT

A data processing device transmits specific information through a network, receives a public key transmitted based on the specific information through the network, and stores the received public key. Further, the data processing device receives print data and encrypted data corresponding to the print data, decrypts the received encrypted data by using the stored public key, and prints the received print data if the data after it was decrypted is specific data. Meanwhile, the data processing device does not print the received print data if the data after it was decrypted is not the specific data.

2 Claims, 7 Drawing Sheets

DATA PROCESSING DEVICE, INFORMATION PROCESSING DEVICE, AND DATA PROCESSING SYSTEM

BACKGROUND OF THE INVENTION

1. Field of the Invention

The present invention relates to a data processing device, an information processing device, and a data processing system.

2. Related Background Art

In recent years, a print system in which a printer is shared by plural users through a network or the like increases. In the relevant system, anybody can execute printing without limitation, whereby there is a problem in security that secret documents and private documents are printed, and/or there is a problem in cost that needless printing is massively executed.

To solve these problems, there is the technique of previously setting the printable upper-limit value for each department (or section) or each user, and causing a printer to execute the printing within the range of the upper-limit value for each department or each user after authenticating the department or the user (for example, see Japanese Patent Application Laid-Open No. H11-212744).

Incidentally, a printer which acts as a multifunction peripheral has various functions such as a printer function for printing the document formed by a computer, a color print function, a copy function, a color copy function, a facsimile transmission/reception function, a transmission function for transmitting an electronic data generated by scanning an image or the like, and the like. Moreover, anybody can freely use every functions, whereby there is a problem in security that a secret document is transmitted through facsimile, and/or there is a problem in cost that needless color printing is executed.

To solve these problems, there is the technique of, even if plural different-level users share a printer, causing the relevant printer to display the screen of the operation panel which is the state suitable with respect to each user (for example, see Japanese Patent Application Laid-Open No. H11-150559). Moreover, according to the relevant printer, for example, it is possible to set the limitation that a certain user can use all the functions but other users can use only the copy function (that is, other users cannot use the transmission function).

However, to set the printer to be in the access-controlled state, various settings are necessary. For example, if a predetermined public key is necessary to execute the access control in the printer, it is necessary to properly register the predetermined public key to the printer.

SUMMARY OF THE INVENTION

The present invention has completed substantially in consideration of such a point as described above, and the object thereof is to provide a technique for effectively registering, to a data processing device (that is, a printer), the information necessary to set the relevant data processing device to be in an access-controlled state.

To achieve the above object, the present invention is characterized by a data processing device comprising: a specific information transmission unit adapted to transmit specific information through a network; a public key reception unit adapted to receive through the network a public key transmitted based on the specific information; a storage unit adapted to store the public key received by the public key reception unit; a reception unit adapted to receive print data and encrypted data corresponding to the print data; a decryption unit adapted to decrypt the encrypted data received by the reception unit, by using the public key stored by the storage unit; and a print unit adapted to print the print data received by the reception unit, in a case where the data after it was decrypted by the decryption unit is predetermined data, wherein, in a case where the data after it was decrypted by the decryption unit is not the predetermined data, the print unit does not print the print data received by the reception unit.

Further, the present invention is characterized by an information processing device comprising: a specific information reception unit adapted to receive specific information transmitted by a data processing device through a network; an analysis unit adapted to analyze the specific information received by the specific information reception unit; and a public key transmission unit adapted to transmit a public key of the information processing device to the data processing device through the network, according to a result of the analysis by the analysis unit.

Furthermore, the present invention is characterized by a data processing system in which a data processing device, a first information processing device and a second information processing device are mutually connected through a network, wherein: the data processing device comprises a specific information transmission unit adapted to transmit specific information to the first information processing device, a public key reception unit adapted to receive a public key from the first information processing device, a storage unit adapted to store the public key received by the public key reception unit, a reception unit adapted to receive print data and encrypted data corresponding to the print data from the second information processing device, a decryption unit adapted to decrypt the encrypted data received by the reception unit, by using the public key stored by the storage unit, and a print unit adapted to print the print data received by the reception unit, in a case where the data after it was decrypted by the decryption unit is predetermined data; the first information processing device comprises a specific information reception unit adapted to receive the specific information from the data processing device, an analysis unit adapted to analyze the received specific information, and a public key transmission unit adapted to transmit the public key of the first information processing device to the data processing device according to a result of the analysis; and the second information processing device comprises a transmission unit adapted to transmit the print data and the encrypted data corresponding to the print data to the data processing device.

Moreover, the present invention is characterized by a data processing method comprising: a specific information transmission step of transmitting specific information through a network; a public key reception step of receiving through the network a public key transmitted based on the specific information; a storage step of storing the received public key; a reception step of receiving print data and encrypted data corresponding to the print data; a decryption step of decrypting the encrypted data received in the reception step, by using the public key stored in the storage step; and a print step of printing the print data received in the reception step, in a case where the data after it was decrypted in the decryption step is predetermined data.

Moreover, the present invention is characterized by an information processing method comprising: a specific information reception step of receiving specific information transmitted by a data processing device through a network; an analysis step of analyzing the specific information received in the specific information reception step; and a public key transmission step of transmitting a public key to the data processing device through the network according to a result of the analysis in the analysis step.

Moreover, the present invention is characterized by a data processing device comprising: a specific information transmission unit adapted to transmit specific information through a network; a reception unit adapted to receive information transmitted based on the specific information, the received information being necessary to control use of the data processing device by a user; and a storage unit adapted to store the information received by the reception unit.

DETAILED DESCRIPTION OF THE PREFERRED EMBODIMENTS

Figure 1:
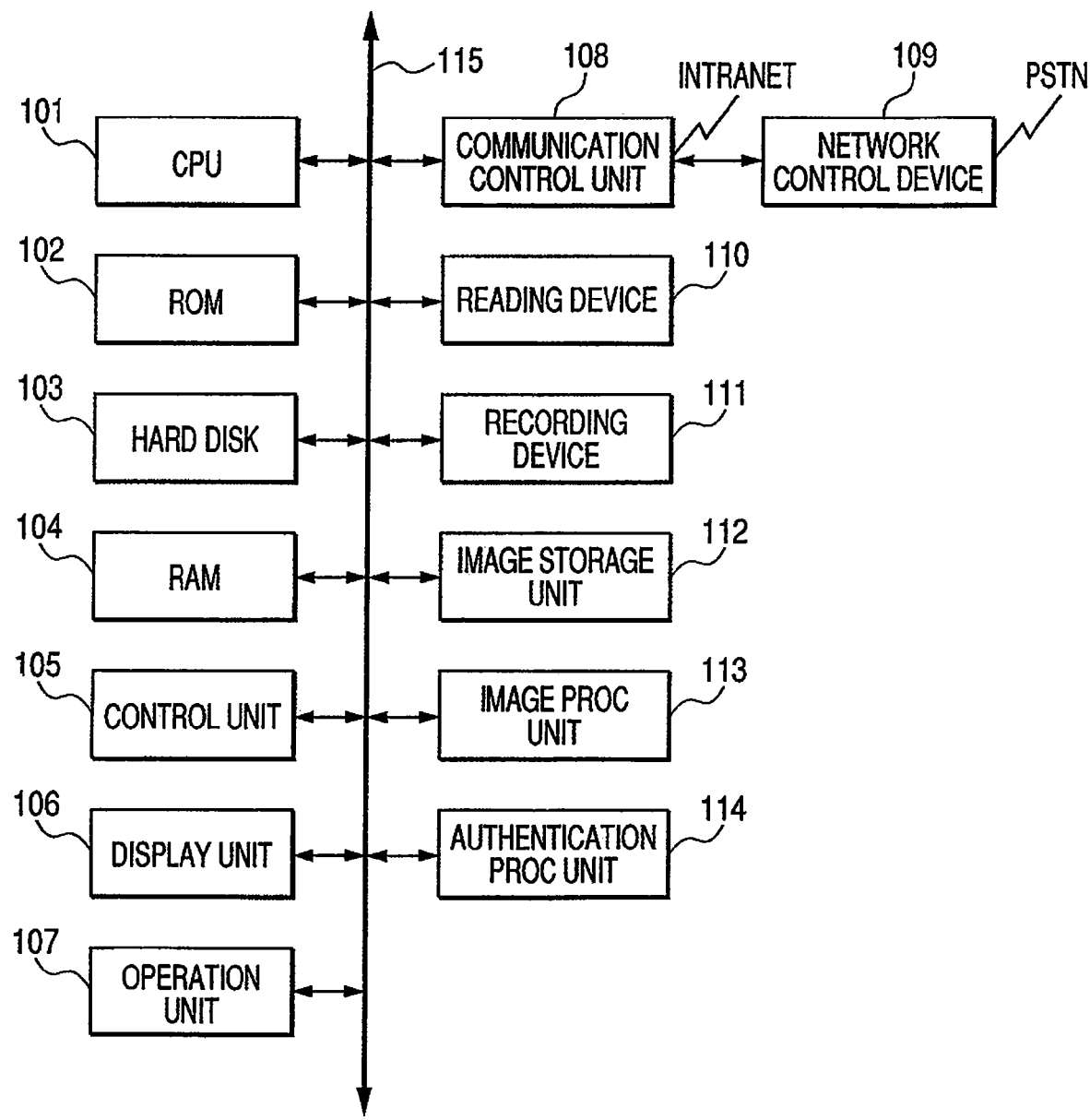
FIG. 1 is a block diagram showing an example of the constitution of a multifunction peripheral.

FIG. 1 is a block diagram showing an example of the constitution of a multifunction peripheral 330 (FIG. 3) which acts as the data processing device. In FIG. 1, a ROM (read only memory) 102 or a hard disk 103 stores the control computer program. A RAM (random access memory) 104 stores various information such as the driving condition data, the management data and the like of the respective units disposed in the multifunction peripheral 330, and the RAM 104 also stores the data necessary when the multifunction peripheral 330 operates. A CPU (central processing unit) 101 reads the control program stored in the ROM 102 or the hard disk 103, and then operates by using the RAM 104 in accordance with the read control program. Thus, together with later-described various functions, a control unit 105 executes various processes in the present embodiment. Incidentally, the CPU 101 carries out the processes later explained with reference to the flow charts by executing the control program.

A display unit 106 displays various information such as driving condition data, device state data, input information and the like. An operation unit 107 includes the keys such as the numeric keypad, the start key and the like for executing user setting, instruction inputting and the like, the touch panel partially included in the display unit 106, and the like.

A communication control unit 108 which is connected to an intranet or the Internet executes transmission and reception of document data including image data, control commands and the like. A network control device 109 which is connected to a PSTN (public switched telephone network) executes predetermined line control at the time of data transmission and reception so as to connect and disconnect the line. Further, the network control device 109 modulates and demodulates image data and control signals by using the built-in modem for facsimile transmission and reception.

A reading device 110 irradiates light to an original image to be transmitted, copied or stored, executes photoelectric conversion to the reflection light from the irradiated original image, and then reads the image data acquired by the photoelectric conversion. A recording device (print means) 111 forms (prints) the read or received image data or the received print data on a recording paper as a permanent visible image, and then outputs the image-formed recording paper. An image storage unit 112 temporarily stores the read or received image data or the received print data. Here, it should be noted that the image storage unit 112 may be disposed in the hard disk 103 according to the device state and/or the environments.

An image processing unit 113 compresses and encodes the image data to be transmitted, and extracts and decodes the received image data. Further, the image processing unit 113 converts the received print data into the image data, and converts the stored image data into the data of an appropriate format or the data a user-designated format (for example, PDF (Portable Document Format) data, or the like). Furthermore the image processing unit 113 executes an image correction process according to the optical response characteristic of the reading device 110, the dispersion of the sender and the like, and executes an image process such as a zoom process to the image input by the user through the operation unit 107. Moreover, the image processing unit 113 executes, according to a request, an image optimization process or the like to the image data suitable for the writing characteristic or the like of the recording device 111. An authentication processing unit 114 executes user authentication, and also executes print job authentication.

Here, the CPU 101, the ROM 102, the hard disk 103, the RAM 104; the control unit 105, the display unit 106, the operation unit 107 and the communication control unit 108 are connected to a bus 115. Also, the reading device 110, the recording device 111, the image storage unit 112, the image processing unit 113 and the authentication processing unit 114 are connected to the bus 115.

Incidentally, the multifunction peripheral has the facsimile communication function of transmitting the read image data, and the transfer function of transferring the data to the document management server computer. Also, the multifunction peripheral has the copying function of record-outputting the read image data, the reception print function of facsimile-receiving the image data, and the print function of receiving and printing the print data from the client computer. Accordingly, it should be noted that the multifunction peripheral can be used as the facsimile machine, the printer device and the scanner device in addition to the copying machine.

Besides, the multifunction peripheral has the user authentication function. Therefore, for example, if a magnetic card on which a department number and a password have been registered is loaded or inserted in the storage medium control unit, the authentication processing unit 114 reads the department number and the password both previously set in the ROM 102 or the hard disk 103, and then authenticates the loaded or inserted magnetic card by comparing the department number and the like registered on the relevant magnetic card with the department number and the like read from the ROM 102 or the hard disk 103. Moreover, even if the magnetic card is not used, it is apparent that it is possible to cause the user to input the department number and the password through the operation unit 107 and then cause the authentication unit 114 to execute the authentication based on the input department number and the like.

Besides, although the recording device 111 adopts an electrophotographic recording method in the present embodiment, it is apparent that the recording device 111 can adopt, for example, an inkjet recording method, a thermal head recording method, a dot impact recording method, and another appropriate method.

Figure 2:
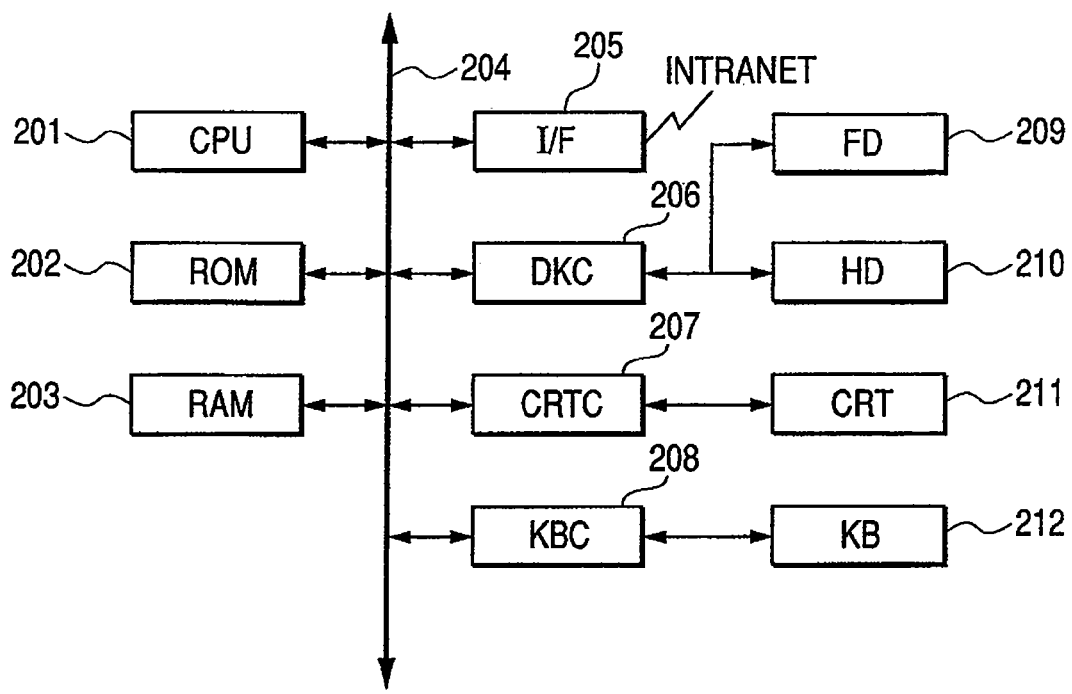
FIG. 2 is a block diagram showing an example of the schematic constitution of each of a management server computer and a print client computer.
Figure 3:
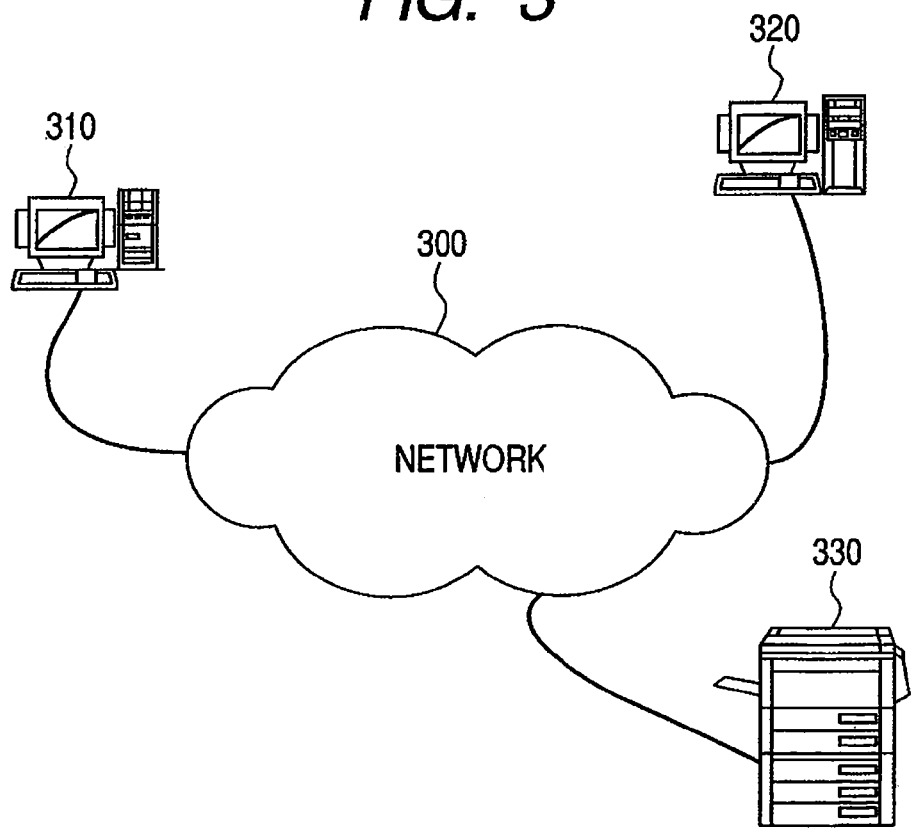
FIG. 3 is a diagram showing an example of the configuration of a network.

FIG. 2 is a block diagram showing an example of the schematic constitution of each of a management server computer 320 and a client computer (or a print client computer) 310, shown in FIG. 3, which is the information processing device according to the present embodiment. In FIG. 2, a ROM 202, an HD (hard disk) 210 or an FD (flexible disk) 209 stores the computer program. Therefore, a CPU 201 reads the computer program from the ROM 202, the HD 210 or the FD 209 and then executes the read computer program, so as to totally control the respective devices connected to a system bus 204 and thus execute the processes according to the later-explained flow charts.

Moreover, numeral 203 denotes a RAM which functions as the main memory, the working area and the like of the CPU 201, and numeral 208 denotes a KBC (keyboard controller) which acts as the user command input controller to control the instructions input through a KB (keyboard) 212, a not shown pointing device and the like. Numeral 207 denotes a CRTC (CRT (cathode ray tube) controller) which controls the display state of a CRT 211 which acts as the display unit, and numeral 206 denotes a DKC (disk controller) which controls accessing to the HD 210 and the FD 209. Here, it should be noted that each of the HD 210 and the FD 209 can store boot programs, various applications, editing files, user files, the programs to be used in the present embodiment, and the like. Numeral 205 denotes an I/F (interface) which acts as the host interface for bidirectionally transmitting and receiving the various data to and from a local printer, a network printer, another network device, or another PC (personal computer).

FIG. 3 is the diagram showing an example of the network configuration of the data processing system according to the present embodiment. Here, the multifunction peripheral 330 has the constitution shown in FIG. 1, and each of the management server computer 320 and the client computer 310 has the constitution shown in FIG. 2. Moreover, the client computer 310, the management server computer 320 and the multifunction peripheral 330 are connected to a network 300.

In FIG. 3, the network 300 is the network which supports, for example, the TCP/IP (Transmission Control Protocol/Internet Protocol), the client computer 310 is the client computer which is used by general users, and the management server computer 320 is the management server computer which is called an SA (security agent) for issuing access control data (also called ACD hereinafter) of each of the managed users to the managed multifunction peripheral 330. Here, it should be noted that the SA is the module which is exclusively trusted on the network, and thus the SA guarantees to prevent alteration of the ACD and the data generated by the printer driver (that is, a PDL job). The multifunction peripheral 330 prints, for example, the electronic document which is generated by the user based on the application through the client computer 310, by using the access-controlled multifunction peripheral 330 which is connected through the network. In that case, the client computer 310 transmits, together with the print data, the ACD issued by the management server computer 320 to the multifunction peripheral 330 through the network 300. Then, the multifunction peripheral 330 refers to the ACD as well as the print data, and thus determines the subsequent operation.

Here, it should be noted that the ACD includes the data indicating, from among the functions of the multifunction peripheral, the functions available for the user, the data indicating the number of prints per month, the data indicating the upper limit value of the number of prints pet month, and the like.

Moreover, it should be noted that the above constitutions and the above configuration are merely directed to the general conception, and it is of course needless to say that plural client computers and plural multifunction peripherals available for general users can be provided. Besides, it should be noted that the multifunction peripheral need not necessarily be used in the present embodiment. That is, it is of course needless to say that stand-alone devices such as a scanner, a printer, a facsimile machine and the like can be connected to the network 300.

Figure 4:
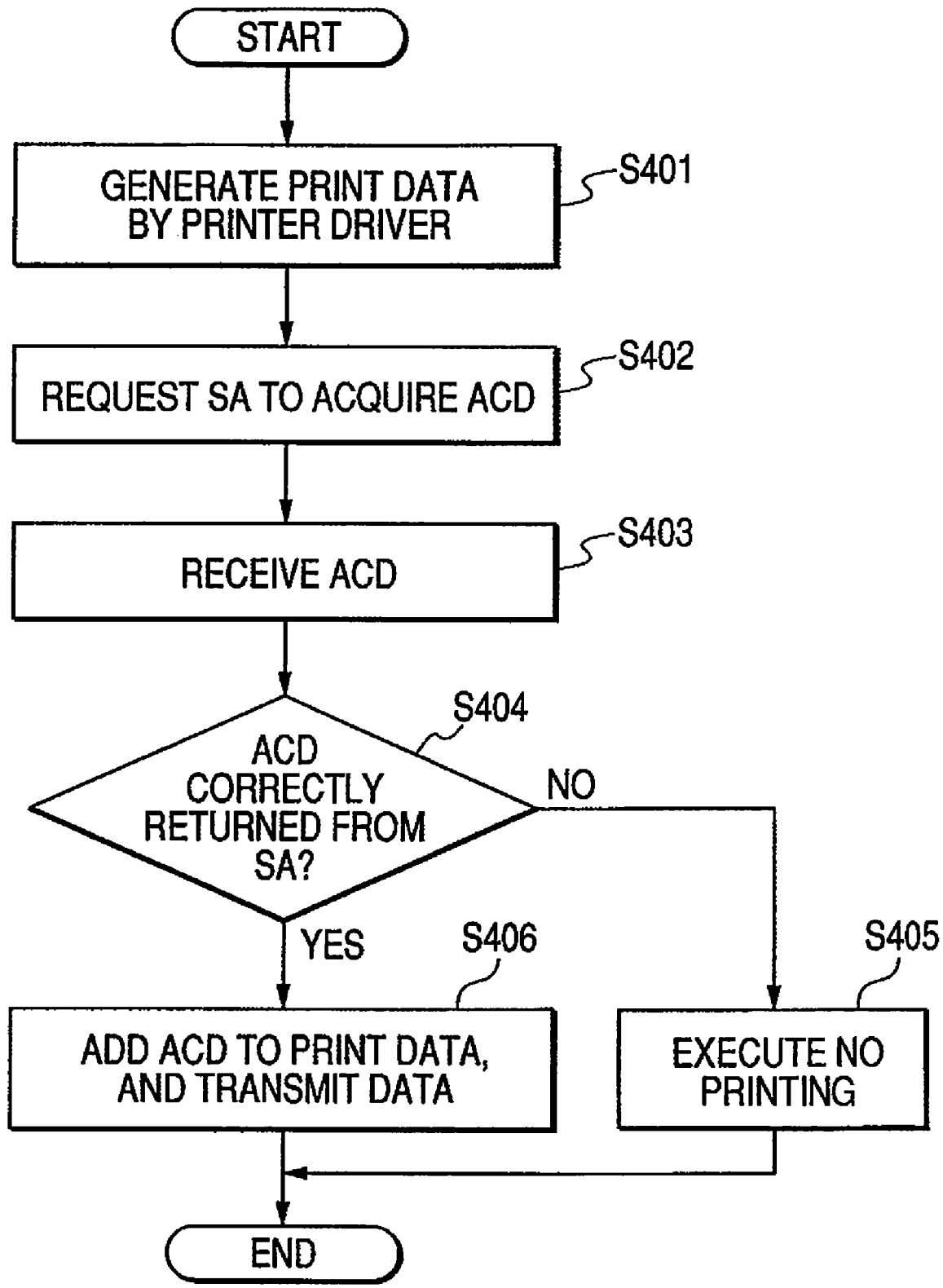
FIG. 4 is a flow chart for explaining an example of the print process.

FIG. 4 is a flow chart for explaining an example of the print process in which the print client computer 310 generates the print data and transmits the generated print data to the access-controlled multifunction peripheral 330.

In a step S401, the printer driver on the print client computer generates the print data. Then, in a step S402, the print client computer transmits an ACD acquisition request (or ACD generation request) to the SA (that is, the management server computer). In that case, for example, it is thought that the print client computer transmits a printer user name and the corresponding password. Further, if the directory service is provided on the network and the necessary authentication has ended, it is thought that the print client computer transmits only a user name. Furthermore, it is thought that the print client computer transmits a user ID or the like. Moreover, it is thought that the print client computer transmits not only the user discrimination information but also the multifunction peripheral discrimination information such as, for example, the IP (internet protocol) address of the multifunction peripheral by which the print process is executed.

In a step S403, the print client computer receives, from the management server computer (that is, the SA), the ACD to which the signature data has been added or an error value. Then, in a step S404, it is judged by the print client computer whether or not the ACD is correctly returned from the management server computer. If it is judged that the ACD is not correctly returned from the management server computer, that is, if the error value is returned, the flow advances to a step S405. In the step S405, the print client computer does not execute any print process. For example, if there is no access right to the multifunction peripheral by which the user intends to execute the print process, the ACD is not correctly returned.

Meanwhile, if it is judged in the step S404 that the ACD is correctly returned from the management server computer, the flow advances to a step S406. In the step S406, the print client computer adds the acquired ACD to the print data, and then transmits to the multifunction peripheral the print data and the ACD to which the signature data has been added.

Figure 5:
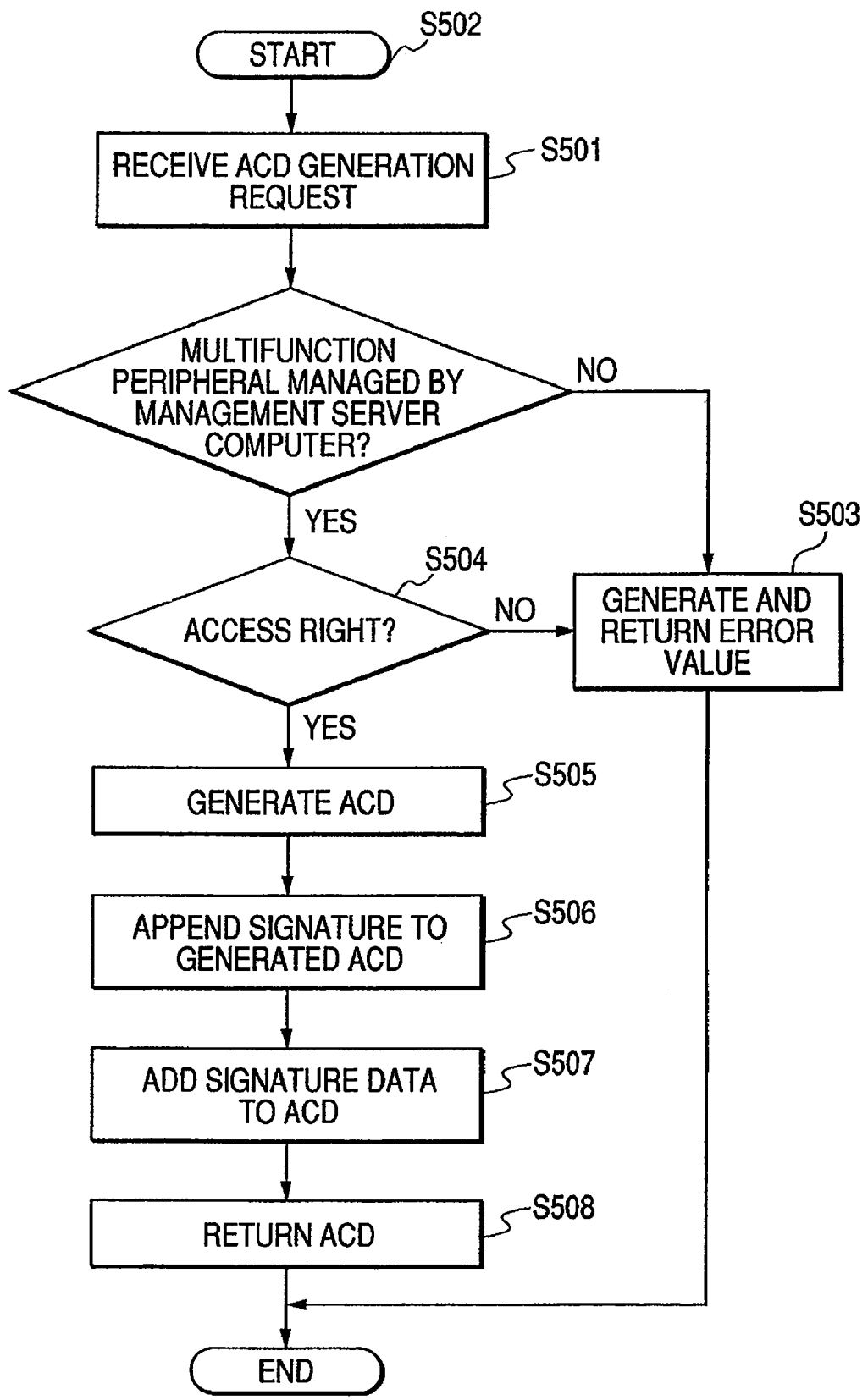
FIG. 5 is a flow chart for explaining an example of the process to be executed by the management server computer.

FIG. 5 is a flow chart for explaining an example of the process in which the management server computer (that is, the SA) generates and returns the ACD.

In a step S501, the management server computer receives the ACD generation request from the print client computer. Then, in a step S502, the management server computer picks up, from the ACD generation request, the discrimination information of the multifunction peripheral by which the print process is executed, and then judges whether or not the multifunction peripheral indicated by the discrimination information is equivalent to the multifunction peripheral which should be managed by the management server computer. If it is judged that the multifunction peripheral indicated by the discrimination information is not equivalent to the multifunction peripheral which should be managed by the management server computer, the flow advances to a step S503. In the step S503, the management server computer generates the error value, and returns the generated error value to the print client computer from which the ACD generation request was transmitted.

Meanwhile, if it is judged in the step S502 that the multifunction peripheral indicated by the discrimination information is equivalent, to the multifunction peripheral which should be managed by the management server computer, the flow advances to a step S504. In the step S504, the management server computer picks up, from the ACD generation request, the discrimination information of the user who requested the print process, and then judges based on the discrimination information whether or not there is the access right to the multifunction peripheral by which the user intends to execute the print process. If there is no access right to the multifunction peripheral by which the user intends to execute the print process, the flow advances to the step S503. Thus, in the step S503, the management server computer generates the error value, and returns the generated error value to the print client computer from which the ACD generation request was transmitted.

Meanwhile, if there is the access right to the multifunction peripheral by which the user intends to execute the print process, the flow advances to a step S505 to generate the ACD corresponding to the user who was discriminated based on the above discrimination information. Then, the flow further advances to a step S506 to execute the signature to prevent alteration of the generated ACD. Here, it should be noted that there are various methods of executing the signature. For example, it is thought that the hash value of the ACD is encrypted by using a private key of the management server computer.

Next, in a step S507, the management server computer adds the signature data generated in the step S506 to the ACD. Then, in a step S508, the management server computer returns the ACD to which the signature data has been added to the print client computer from which the ACD generation request was transmitted.

Figure 6:
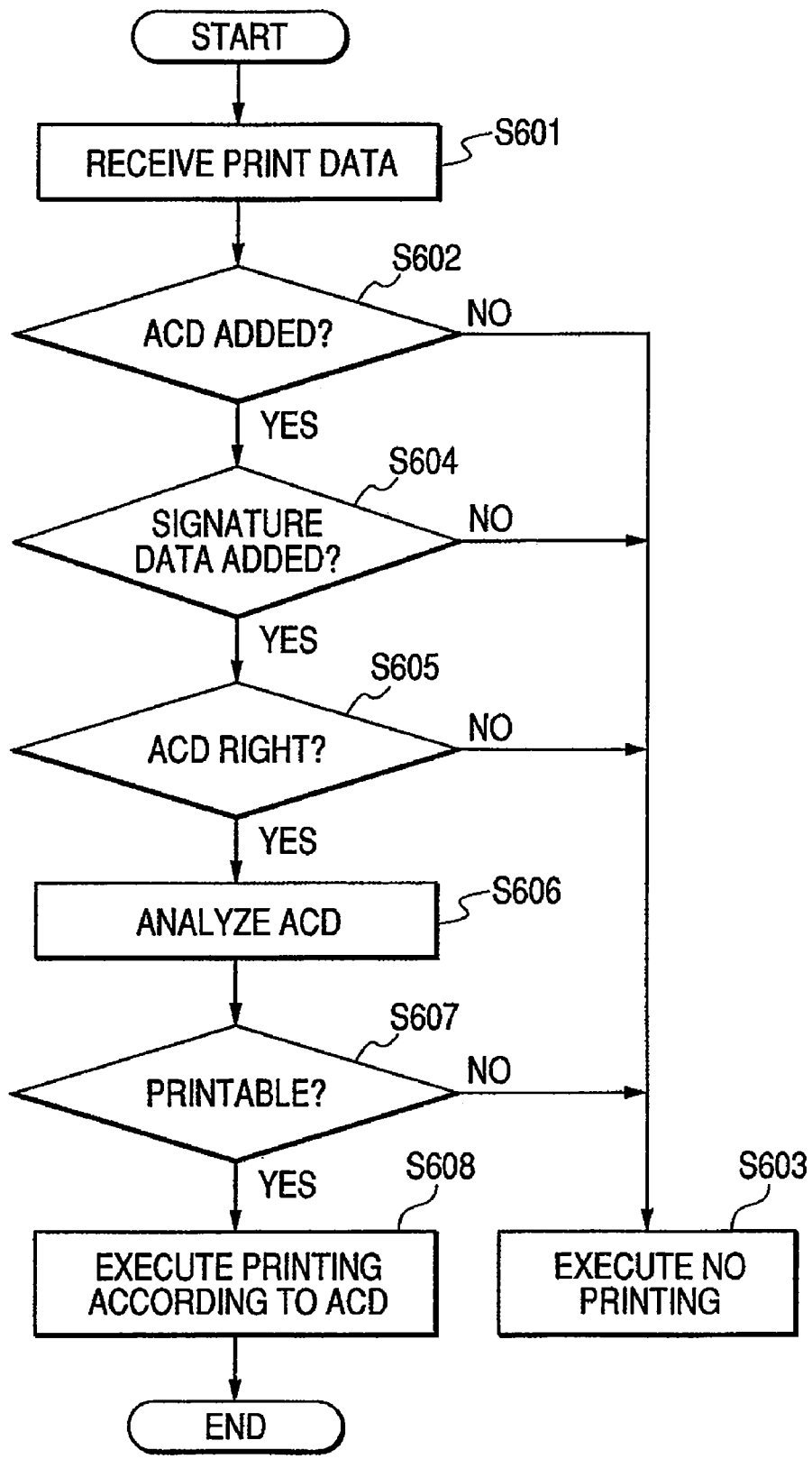
FIG. 6 is a flow chart for explaining an example of the process to be executed by the multifunction peripheral.

FIG. 6 is a flow chart for explaining an example of the process of confirming right of the ACD in the multifunction peripheral.

In a step S601, if the multifunction peripheral receives the print data from the print client computer, the flow advances to a step S602 to judge whether or not the ACD has been added to the received print data. If it is judged that the ACD is not added to the received print data, the flow advances to a step S603. In the step S603, the multifunction peripheral does not execute any print process. Incidentally, in consideration of usability for the user, it is preferable for the multifunction peripheral to display the history that no print process is executed because there is no ACD, and/or to notify the print client computer of the relevant history.

Meanwhile, if it is judged in the step S602 that the ACD has been added to the received print data, the flow advances to a step S604. In the step S604, it is judged by the multifunction peripheral whether or not the signature data of the ACD has been added to the print data. If it is judged that the signature data of the ACD is not added to the received print data, the flow advances to the step S603. In the step S603, the multifunction peripheral does not execute any print process.

Meanwhile, if it is judged in the step S604 that the signature data of the ACD has been added to the received print data, the flow advances to a step S605. In the step S605, the multifunction peripheral verifies based on the added ACD and the added signature data whether or not the ACD has been altered. Meanwhile, if it is judged that the added signature data has been encrypted, that is, if the hash value of the ACD has been encrypted by using the private key of the management server computer, the multifunction peripheral acquires the public key of the management server computer, and decrypts the added signature data by using the public key of the management server computer. Then, the multifunction peripheral compares the hash value of the added ACD with the value encrypted by using the public key. In other words, if the encrypted value is the same as the hash value of the added ACD, the multifunction peripheral judges that the relevant ACD is right (that is, the verification succeeded). Meanwhile, if the encrypted value is different from the hash value of the added ACD, the multifunction peripheral judges that the relevant ACD is not right because of alteration or the like (that is, the verification failed).

If the multifunction peripheral verifies in the step S605 that the ACD is not right, the flow advances to the step S603. In the step S603, the multifunction peripheral does not execute any print process. Meanwhile, if the multifunction peripheral verifies in the step S605 that the ACD is right, the flow advances to a step S606 to execute syntax analysis of the ACD. Then, in a step S607, the multifunction peripheral judges whether or not to be able to execute the print process according to the analyzed ACD. If the multifunction peripheral judges not to be able to execute the print process according to the analyzed ACD, the flow advances to the step S603. More specifically, if the number of prints per month exceeds a predetermined upper-limit value, the multifunction peripheral judges not to be able to execute the print process. Also, if the function of the multifunction peripheral to be used for printing the print data is not included in the functions of the usable multifunction peripheral indicated according to the ACD, the multifunction peripheral judges not to be able to execute the print process. Meanwhile, if the multifunction peripheral judges to be able to execute the print process according to the analyzed ACD, the flow advances to the step S608. In the step S508, the multifunction peripheral prints the received print data according to the analyzed ACD.

Incidentally, if the multifunction peripheral does not execute the print process, it is preferable for the multifunction peripheral to display and/or send such a fact to the user. Also, it is preferable for the multifunction peripheral to record the history thereof and/or notify the user of the fact of no printing.

Figure 7:
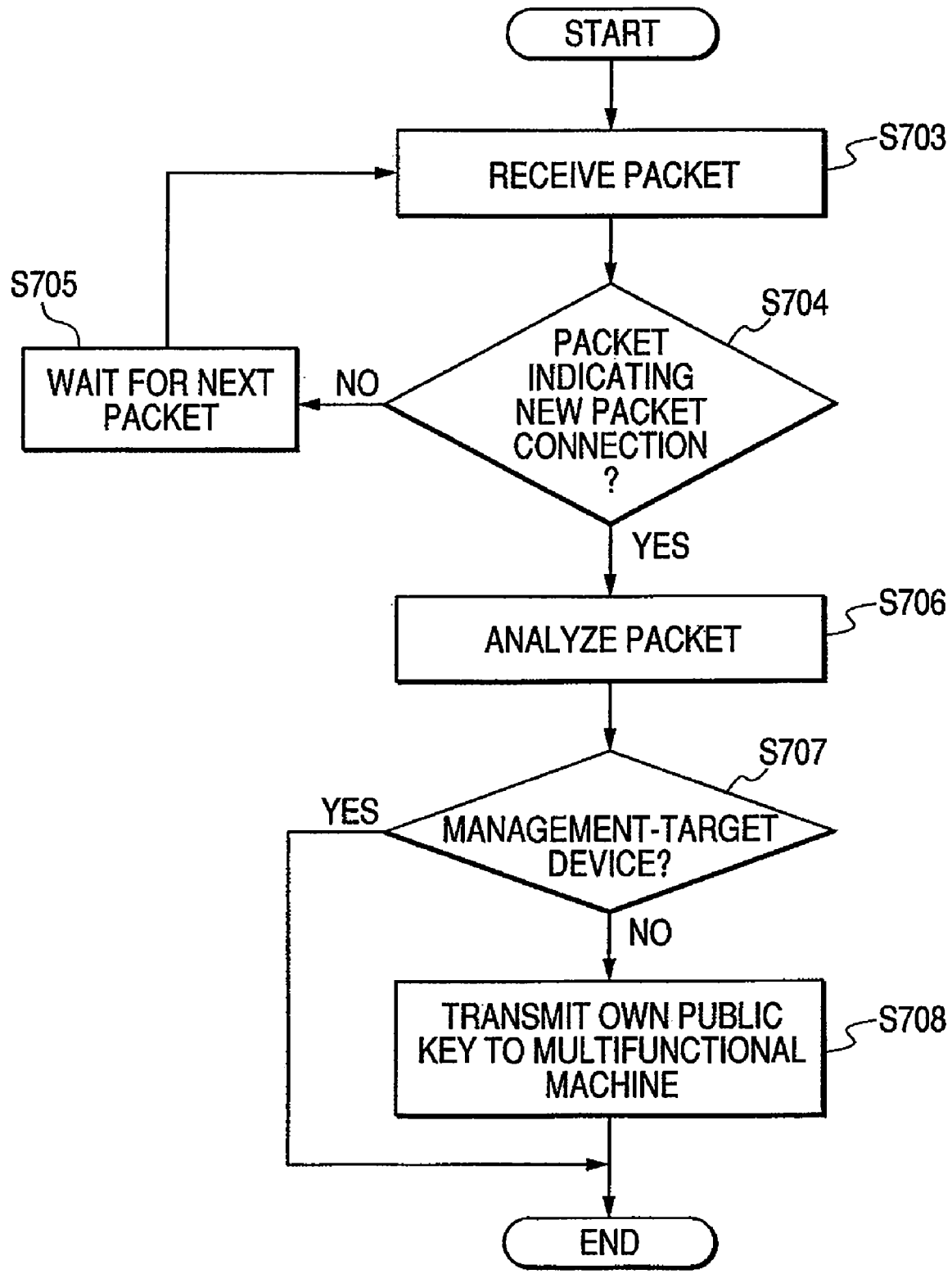
FIG. 7 is a flow chart for explaining an example of the access control process to be executed by an image formation system.

FIG. 7 is a flow chart for explaining an example of the process in which the management server computer transmits the public key to the multifunction peripheral.

More specifically, the multifunction peripheral which is connected to the network executes multicast transmission of the specific packet (specific information) indicating that the new device is connected, to the specific ports.

On the other hand, the management server computer monitors the packet transmitted to the specific port. Then, in a step S703, the management server computer receives the packet transmitted to the specific port. Subsequently, in a step S704, the management server computer judges whether or not the received packet is the specific packet indicating that the new device is connected. If it is judged that the received packet is not the specific packet, the flow advances to a step S705. In the step S705, the management server computer waits for the next packet transmitted to the specific port. Then, if the management server computer receives the next packet, the flow advances to the step S703.

Meanwhile, if it is judged in the step S704 that the received packet is the specific packet, the flow advances to a step S706. In the step S706, the management server computer analyzes the received specific packet to acquire, for example, the device name, the MAC (Media Access Control) address of the devices and the like.

Subsequently, in a step S707, the management server computer judges whether or not the multifunction peripheral specified by the specific packet is the device to be managed (this device is called the management-target device hereinafter). More specifically, the management server computer which has the MAC address list of the management-target devices judges whether or not the MAC address included in the specific packet is included in the relevant list.

In any case, if it is judged in the step S707 that the multifunction peripheral specified by the specific packet is the management-target device, the management server computer does not execute anything, and the process ends. Meanwhile, if it is judged in the step S707 that the multifunction peripheral specified by the specific packet is not the management-target device, the flow advances to a step S708. In the step S708, the management server computer registers as the management-target device the multifunction peripheral specified by the specific packet, and transmits the public key of the management server computer to the relevant multifunction peripheral. Incidentally, if it is quite new, for example, if any DHCP (dynamic host configuration protocol) is not set and thus the transmission is impossible in such a state, the management server computer can set the IP address to the multifunction peripheral in various methods before transmitting the public key.

Figure 8:
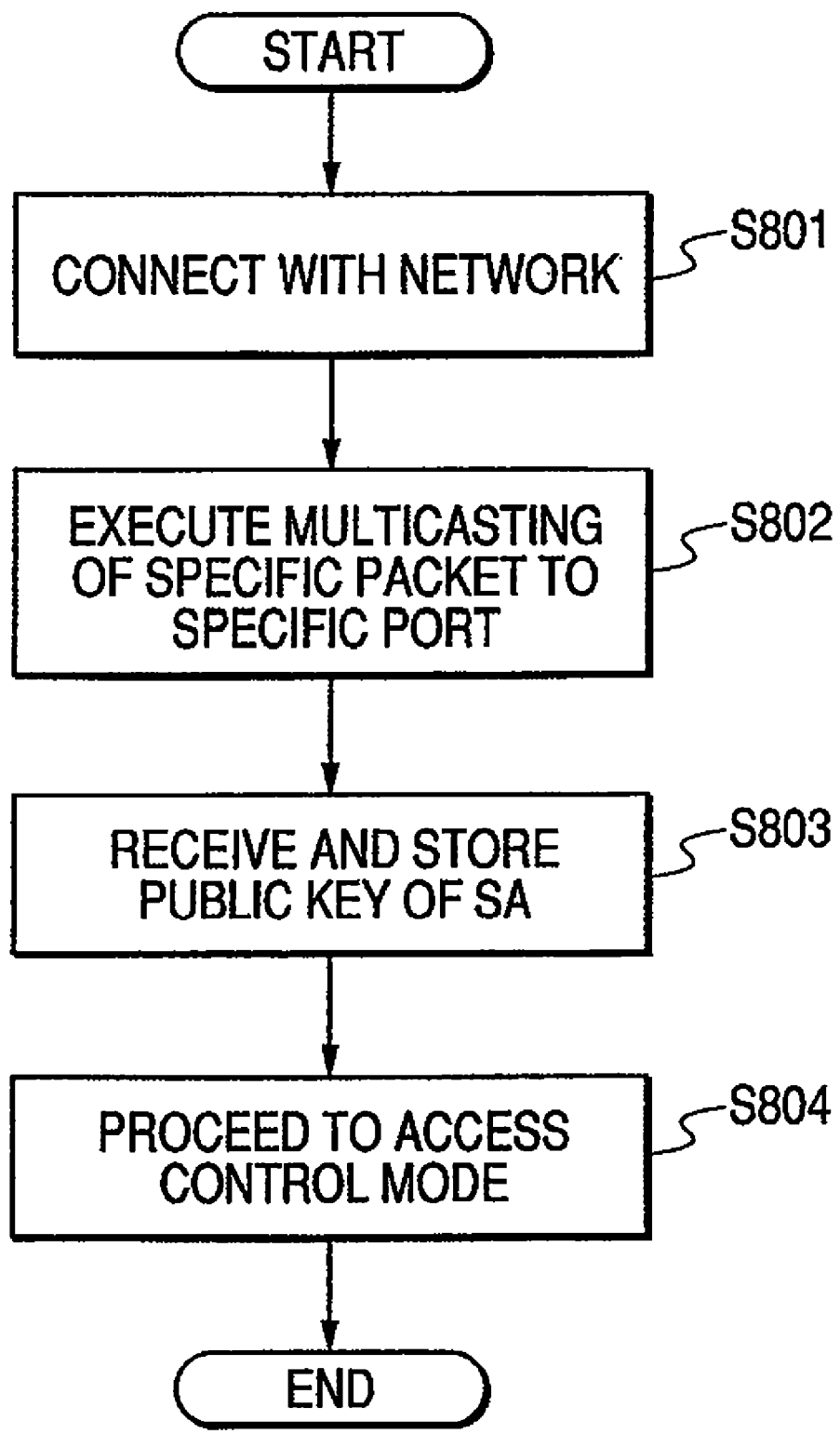
FIG. 8 is a flow chart showing an example of the process to be executed by the multifunction peripheral, corresponding to the flow chart shown in FIG. 7.

FIG. 8 is a flow chart showing an example of the process to be executed by the multifunction peripheral, corresponding to the flow chart shown in FIG. 7.

In a step S801, the multifunction peripheral connects with the network. Next, in a step S802, the multifunction peripheral executes the multicast transmission of the specific packet (specific information) indicating that the new device is connected, to the specific ports. Here, it should be noted that the specific packet includes the information concerning the multifunction peripheral or own electronic key.

After then, the management server computer executes the processes in the steps S703 to S708 of FIG. 7. More specifically, the management server computer receives the specific packet from the multifunction peripheral, and then returns the public key thereof to the multifunction peripheral if the relevant multifunction peripheral is not the management-target device.

Subsequently, in a step S803, the multifunction peripheral receives and stores the public key transmitted from the management server computer. Next, in a step S804, the multifunction peripheral proceeds to the access control mode so as to operate as the access-controlled multifunction peripheral. Incidentally, if it is impossible to receive the public key from the management server computer, the multifunction peripheral does not proceed to the access control mode.

According to the present embodiment, it is possible for the management server computer to effectively delivery the public key of the management server computer necessary for the access control to the multifunction peripheral. Then, the multifunction peripheral proceeds to the access control mode as soon as it acquires and stores the public key of the management server computer. Thus, in the environment that the multifunction peripheral should be access-controlled, it is possible to set the multifunction peripheral to be in the access-controlled state without troubling the administrator. Besides, in the environment that the multifunction peripheral should be access-controlled, it is possible to prevent that the administrator forgets to access-control the multifunction peripheral.

As described above, according to the present embodiment, it is possible to cause the multifunction peripheral to operate as the automatically access-controlled data processing device, whereby it is thus possible to prevent the information leakage and the needless printing due to the faulty management.

Incidentally, the processing method to be executed until the multifunction peripheral is access-controlled is explained in the present embodiment. However, the present invention is not limited to this. That is, it is of course possible to display, at the time when the multifunction peripheral acquires the public key of the management server computer, the access control on the UI (user interface) of the multifunction peripheral so that the user can know such a fact.

Moreover, in the present embodiment, to prevent the alteration of the access control data, the management server computer encrypts the hash value of the access control data by using the private key of the management server computer. Then, the multifunction peripheral verifies whether or not the access control data has been altered, by using the decryption key. Consequently, the public key of the management server computer has to be on the side of the multifunction peripheral, whereby the method of delivering the public key of the management server computer is described in the present embodiment. On the other hand, for example, there is a case where it is preferable to hold the public key of the multifunction peripheral on the side of the management server computer to prevent alteration of a job. In this case, it is possible to add the public key of the device to the specific packet indicating that the new device in the present embodiment is connected to the network. Moreover, it is of course possible to send the public key of the device to the management server computer after receiving the public key of the management server computer.

Here, it should be noted that the present embodiment can be achieved by executing the program with the computer. Further, the means for supplying the program to the computer, for example, the computer-readable recording medium such as a CD-ROM or the like of recording thereon the relevant program or the transmission medium such as the Internet or the like of transmitting the relevant program, can be applied as the embodiment of the present invention. Furthermore, the computer program product such as the computer-readable recording medium or the like of recording the relevant program can be applied as the embodiment of the present invention. In this connection, the program, the recording medium, the transmission medium and the computer product as described above are all included in the concept of the present invention. Incidentally, for example, a flexible disk, a hard disk, an optical disk, a magnetooptical disk, a CD-ROM, a magnetic tape, a nonvolatile memory card, a ROM or the like can be used as the recording medium.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

In conclusion, it is possible to cause the multifunction peripheral to operate as the automatically access-controlled data processing device, whereby it is thus possible to prevent the information leakage and the needless printing due to the faulty management.

This application claims priority from Japanese Patent Application No. 2005-042987 filed on Feb. 18, 2005, which is hereby incorporated by reference herein.

What is claimed is:

1. A data processing system in which a data processing device, a first information processing device and a second information processing device are mutually connected through a network, wherein said data processing device comprises a specific information transmission unit configured to transmit specific information to said first information processing device, a public key reception unit configured to receive a public key from said first information processing device, a storage unit configured to store the public key received by said public key reception unit, a reception unit configured to receive print data and encrypted signature data corresponding to the print data from said second information processing device, a decryption unit configured to decrypt the encrypted signature data received by said reception unit, by using the public key stored by said storage unit, and a print unit configured to print the print data received by said reception unit, in a case where signature data after the encrypted signature data was decrypted by said decryption unit is appropriate data, said first information processing device comprises a specific information reception unit configured to receive the specific information from said data processing device, an analysis unit configured to analyze the received specific information, and a public key transmission unit configured to transmit the public key of said first information processing device to said data processing device according to a result of the analysis, and said second information processing device comprises a print data generation unit configured to generate the print data, a request transmission unit configured to transmit to said first information processing device a request for access control data that is necessary to control use of said data processing device by a user, an access control data reception unit configured to receive the access control data and encrypted signature data from said first information processing device, wherein the encrypted signature data is signature data encrypted by using a private key corresponding to the public key, and a transmission unit configured to transmit the print data, the access control data and the encrypted signature data corresponding to the print data, to said data processing device, wherein said first information processing device comprises an access control data transmission unit configured to transmit to said second information processing device the access control data and the encrypted signature data, according to the request for the access control data transmitted from said second information processing device, in a case where the encrypted signature data is added to the print data received from said second information processing device, said decryption unit decrypts the encrypted signature data by using the public key to verify the signature data, and in a case where the signature data after the encrypted signature data was decrypted is appropriate data, said print unit prints the print data.

2. A data processing system according to claim 1, wherein, in a case where the encrypted data is not added to the print data received from said second information processing device or in a case where the signature data is not the appropriate data, said print unit does not print the print data.

* * * * *